(12) United States Patent
Le et al.

(10) Patent No.: US 8,863,295 B1
(45) Date of Patent: Oct. 14, 2014

(54) LINKING VIDEO SHARING ACCOUNTS WITH CONTENT DELIVERY ACCOUNTS

(75) Inventors: Phuong B. Le, Belmont, CA (US); Jonathan Goldman, San Francisco, CA (US); Simon P. Hofer, Zurich (CH)

(73) Assignee: Google Inc., Mountain View, CA (US)

( * ) Notice: Subject to any disclaimer, the term of this patent is extended or adjusted under 35 U.S.C. 154(b) by 274 days.

(21) Appl. No.: 13/275,940

(22) Filed: Oct. 18, 2011

Related U.S. Application Data

(60) Provisional application No. 61/538,468, filed on Sep. 23, 2011.

(51) Int. Cl.
*H04L 9/00* (2006.01)

(52) U.S. Cl.
USPC ..................... 726/26; 726/2; 726/6

(58) Field of Classification Search
USPC ............ 705/7.11, 7.29, 14.4, 14.73; 726/2, 6, 726/26
See application file for complete search history.

(56) References Cited

U.S. PATENT DOCUMENTS

| | | | |
|---|---|---|---|
| 7,171,473 B1 * | 1/2007 | Eftis et al. ..................... | 709/227 |
| 7,428,750 B1 * | 9/2008 | Dunn et al. ..................... | 726/8 |
| 7,739,153 B1 | 6/2010 | Anderson et al. | |
| 7,788,130 B2 | 8/2010 | Feeley et al. | |
| 8,026,931 B2 * | 9/2011 | Sun et al. ..................... | 345/632 |
| 2004/0098302 A1 | 5/2004 | Feeley | |
| 2004/0168052 A1 * | 8/2004 | Clisham et al. ............... | 713/153 |
| 2007/0174118 A1 | 7/2007 | Dekel et al. | |
| 2008/0155588 A1 * | 6/2008 | Roberts et al. .................. | 725/34 |
| 2009/0006211 A1 * | 1/2009 | Perry et al. ..................... | 705/14 |
| 2009/0044237 A1 | 2/2009 | Keiter et al. | |
| 2013/0074167 A1 * | 3/2013 | Bailey et al. ..................... | 726/6 |

OTHER PUBLICATIONS

'Google Support' [online]. "Set up location extensions—AdWords Help," 2011, [retrieved on Sep. 1, 2011]. Retrieved from the Internet: URL: <http://support.google.com/adwords/bin/answer.py?hl=en&answer=2404182&from=144545&rd=1>. 2 pages.
'Google Support' [online]. "Link Google Places and AdWords—Adwords Help," 2011, [retrieved on Sep. 1, 2011]. Retrieved from the Internet: URL: <http://support.google.com/adwords/bin/answer.py?hl=en&answer=1704343>. 3 pages.

* cited by examiner

*Primary Examiner* — William Powers
(74) *Attorney, Agent, or Firm* — Lowenstein Sandler LLP

(57) ABSTRACT

Methods, systems, and apparatus, including computer programs encoded on a computer storage medium, for linking video sharing accounts with content delivery accounts. In one aspect, a method includes providing a control in a user interface associated with a campaign management tool for a content delivery system. The control includes a linking tool for linking a content delivery account associated with a user in the content delivery system with one or more video sharing accounts in a video sharing environment.

30 Claims, 5 Drawing Sheets

LINKING VIDEO SHARING ACCOUNTS WITH CONTENT DELIVERY ACCOUNTS

BACKGROUND

This specification relates to information presentation.

In a video sharing environment, users can provide videos to a video sharing system of one or more computers. Other users can then view the videos, e.g., by downloading or streaming the videos from the video sharing system to a user system. The video sharing environment can support video sharing accounts. To access a video sharing account, a user can supply, for example, a name and login credentials. Once authenticated, account owners can upload videos, access videos and share videos along with managing the account. Account owners can as well view information related to their videos, such as information related to views and the like.

SUMMARY

In general, one innovative aspect of the subject matter described in this specification can be embodied in methods that include the actions of providing a control in a user interface associated with a campaign management tool for a content delivery system, the control including a linking tool for linking a content delivery account associated with a user in the content delivery system with one or more video sharing accounts in a video sharing environment, wherein providing the control includes: providing the control to the user for receiving a name and login credentials associated with a first video sharing account in the video sharing environment; verifying access rights of the user in the first video sharing account using the name and login credentials; and linking the first video sharing account with the content delivery account associated with the user in the content delivery system including providing access to information associated with the first video sharing account. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Verifying access rights of the user includes determining if the name and login credentials match an entry on an approved access list that is associated with the first video sharing account. Providing access to information includes providing access to the information to another user that provides content delivery account credentials for the content delivery account without requiring the other user to provide the name and login credentials associated with the first video sharing account. Providing access to information associated with the first video sharing account includes providing organic performance metrics for a video associated with the video sharing account, wherein the organic performance metrics for the video include a count of a number of views of the video for which no payment was received by the video sharing service. The organic performance metrics for the video include a count of a number of views of the video by users associated with a certain demographic or a certain geographic area. Providing access to information associated with the first video sharing account includes providing access one or more of: demographic information for viewers of a video, geographic information for viewers of a video, and video metadata. Linking the first video sharing account with the content delivery account includes enabling the user to adjust video parameters for a video that is associated with the first video sharing account. Linking the first video sharing account with the content delivery account includes enabling the user to specify an overlay for inclusion in a video that is associated with the first video sharing account. Linking the first video sharing account with the content delivery account includes linking the first video sharing account with plural different content delivery accounts in the content delivery system. Linking the first video sharing account with the content delivery account includes linking plural different video sharing accounts in the video sharing environment with the content delivery account.

Particular embodiments of the subject matter described in this specification can be implemented so as to realize none, one, or more of the following advantages. Users of a content delivery account can access information regarding linked video sharing accounts. The users need not supply credentials for the video sharing accounts after they are linked to the content delivery account. The users can perform additional actions regarding the linked video sharing accounts. For example, a user can view paid performance metrics (typically only available to the content delivery account) against non-paid performance metrics (typically only available to the video sharing account.)

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

One or more video sharing accounts can be linked with one or more content delivery accounts, thereby giving users of the content delivery accounts access to additional information regarding videos that are delivered/accessed in association with content delivered by a content delivery system. To link a content delivery account with a video sharing account, credentials are supplied for both the content delivery account and the video sharing account. After the accounts are linked, a user of the content delivery account does not need to supply credentials for the video sharing account to access certain information regarding the video sharing account.

Figure 1:
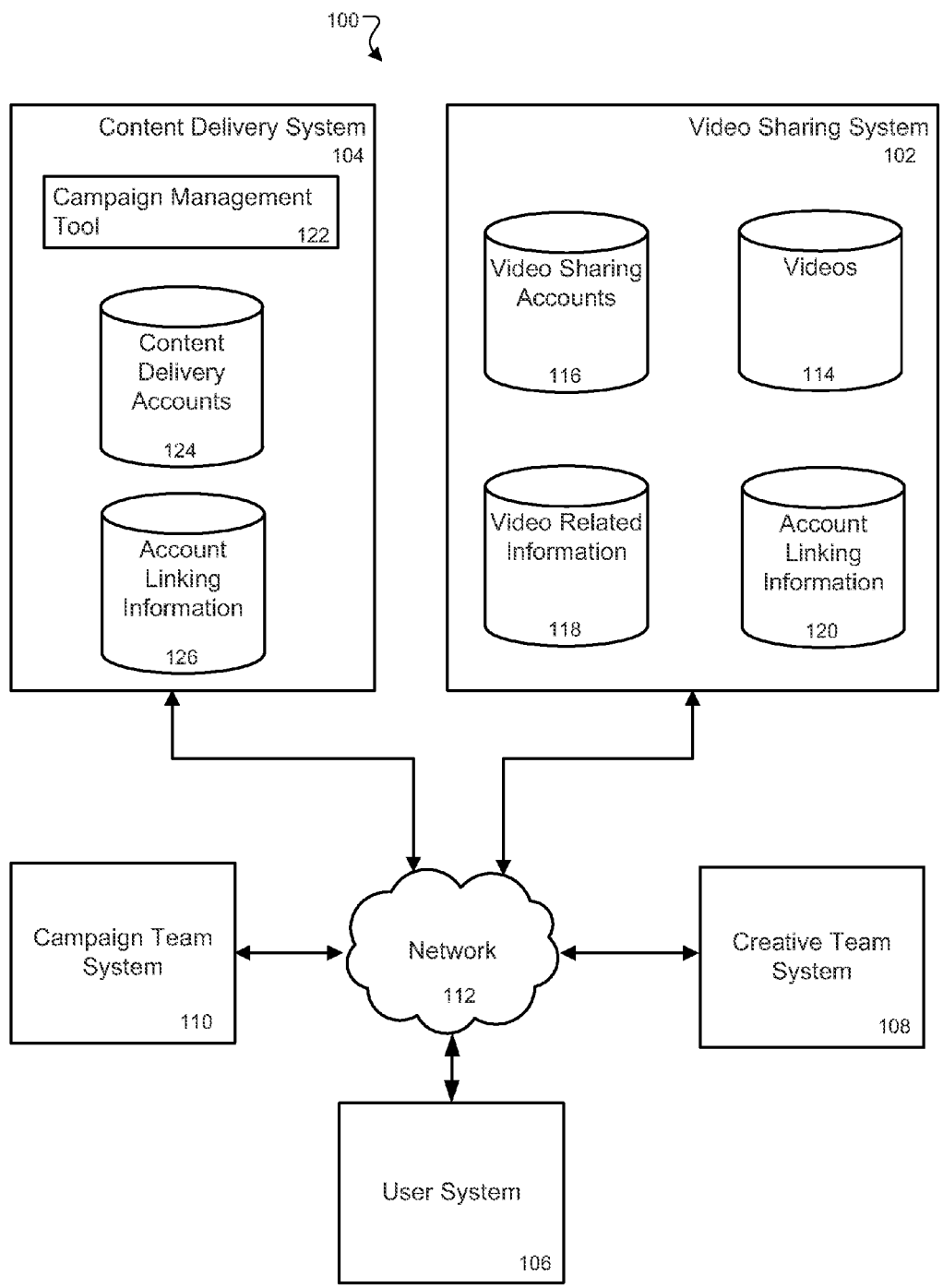
FIG. 1 is a block diagram of an example video sharing environment.

FIG. 1 is a block diagram of an example video sharing environment 100. The video sharing environment 100 includes a video sharing system 102 and a content delivery system 104. The video sharing system 102 and the content delivery system 104 can be implemented in a system of one or more computers.

The video sharing system 102 and content delivery system 104 can communicate, e.g., over a computer network 112 (e.g., the Internet.) The video sharing environment 100 also includes other systems, e.g., a user system 106, a creative team system 108, and a campaign team system 110 that can communicate over the network 112. Each of the user system 106, creative team system 108, and campaign team system 110 can be implemented in a system of one or more computers.

The video sharing system 102 is configured to allow users (e.g., of user system 106) to share videos. The video sharing system 102 receives videos and stores them in a video repository 114. Users can then view the videos, e.g., by downloading them or streaming them from the video sharing system 102. Users can find specific videos, for example, using a search engine, or a directory that categorizes videos, or by receiving links to the videos, e.g., from other users in a social network.

The videos stored by the video sharing system 102 are associated with video sharing accounts. In some implementations, each account has a name and login credentials, which are stored in a video sharing accounts repository 116. Account access allows a user of the user system 106 to provide videos to be stored in the video repository 114.

In some implementations, a video sharing account can have a primary user. The primary user can allow others to access the video sharing account. Alternatively, a video sharing account can be shared by one or more users. For example, a creative team of several users can create videos for a single creative team account. Any one of the users who knows the creative team account name and login credentials can access the account, e.g., to provide new videos. The users can use the creative team system 108 to access the creative team account.

Users of the content delivery system 104 can create one or more campaigns that allow for the distribution of content (e.g., video advertisements) to various users. For example, a campaign team of one or more users can use the campaign team system 110 to access the content delivery system 104 to set up and manage one or more campaigns. The campaign team can engage the creative team to create a video that is provided to the video sharing system. The campaign team can use the content delivery system 104 to provide payments to an operator of the video sharing system 102 based on, e.g., the number of paid views of a video (where a paid view can arise, e.g., when a video associated with a video advertisement is played/presented by the video sharing system).

For example, suppose the campaign team is promoting a movie. The creative team can create a trailer for the movie and provide it to the video sharing system 102. The campaign team can then specify that the trailer is to be displayed (or more specifically, that a video advertisement that includes a link to the trailer that is hosted by the video sharing system 102 is to be displayed) based on various targeting criteria. The content delivery system 104 can facilitate payment to the operator of the video sharing system 102 in exchange for displaying/playing the trailer. In another example, suppose the campaign team is promoting a new product. The creative team can create a video for the product and provide it to the video sharing system 102. The campaign team can then specify that a video advertisement that includes a link to the video be presented to one or more users in accordance with various targeting criteria.

The content delivery system 104 maintains content delivery accounts. In some implementations, each content delivery account has a name and login credentials, stored in a content delivery accounts repository 124. A content delivery account can be associated with one or more campaigns. For example, a campaign team can establish a content delivery account for multiple campaigns. The content delivery system 104 can be used for content delivery to systems other than the video sharing system 102, e.g., so that a content delivery account can be used to distribute content in a variety of different ways.

The video sharing system 102 maintains video related information 118 for videos. For example, for a given video, the video sharing system 102 maintains a count of the number of times the video is viewed by users, the amount of time that a video is played (e.g., in terms of quartiles), along with other information related to when a view occurred (such as a location of a requestor, a time of request, etc.). The video sharing system 102 can count the number of times the video is viewed and payment is received via a content delivery account ("paid views"), and the video sharing system 102 can count the number of times the video is viewed and no payment is received ("organic views.")

The video related information 118 optionally includes various other information. The video related information 118 can include demographic information regarding the viewers of a video. For example, some viewers have video sharing accounts and voluntarily supply demographic information with the video sharing account. When those users are logged in to the video sharing accounts when they view videos, the video sharing system 102 can maintain counts of demographic groups that view videos.

The video related information can include geographic information regarding the viewers of a video. For example, the video sharing system 102 can determine a location for a user using geolocation techniques.

The video related information can include a list of non-paid referrers to a video. Non-paid referrers can be identified, for example, using an HTTP 'referer' string or via parameters in a URL of a web page that displays the video. The video related information can include percent of video watched (e.g., represented as quartiles, smooth drop-off curve and quartiles/curve in relation to other videos, video sharing accounts, or content delivery accounts.) The video related information can include subscribers, likes (e.g., by users in a social networking service), shares, and favorites. The video related information can include the number of unique viewers of a video.

The video related information can include video metadata (e.g., title, category, captions, subtitles, annotations, and so on.) The video related information can include information specifying an overlay to displayed with a video, e.g., a graphic or animation that is displayed alongside a video or along the bottom of a video while the video is playing. The video related information can include a list of users who watched the video. The list of users can be determined, for example, by including a tracking image on a video watch page that makes a request to the content delivery system 104 to record that a user as identified by the content delivery system watched the video.

The content delivery system 104 includes a campaign management tool 122 that can be used to link content delivery accounts to video sharing accounts. For example, the campaign management tool 122 can provide the control for linking accounts illustrated in FIG. 2. The campaign management tool 122 links accounts by receiving the name and login credentials of a video sharing account to be linked to a content delivery account. By linking a content delivery account to a video sharing account, a user of the content delivery account can access video related information for videos associated with the video sharing account, without having to provide each time login credentials for the video sharing account.

For example, a user of the content delivery account can access video related information that is typically only accessible to users who provide login credentials for the video sharing account. In some video sharing systems, the number of organic views of a video are only accessible to a user who provides login credentials for the video sharing account for the video. By linking accounts, a user of the content delivery account can access the number of organic views of a video of a linked account, without having to provide login credentials for the video sharing account. This is useful, for example, to review information relating to a number of paid views of the video, which is typically available to users of the content delivery account.

A user of a content delivery account linked to a video sharing account need not be given access to all of the video related information for that video sharing account. For example, the user can be restricted from making edits (or a subset of available edits) to a video, e.g., to change the name or metadata of the video, or delete it.

The accounts can be linked using any of a variety of appropriate linking techniques. For example, linking information can be stored on the video sharing system 102 in an account linking information repository, or on the content delivery system 104 in an account linking information repository 126, or both. Suppose that the content delivery system 104 is trusted by the video sharing system 102 (e.g., because a single entity operates both systems, or because operators of the two systems are in cooperation). In that case, a video sharing account can be linked to a content delivery account by storing an entry in the account linking repository 126 having identifiers for both accounts, and the content delivery system 104 does not need to store login credentials for the video sharing account.

Figure 2:
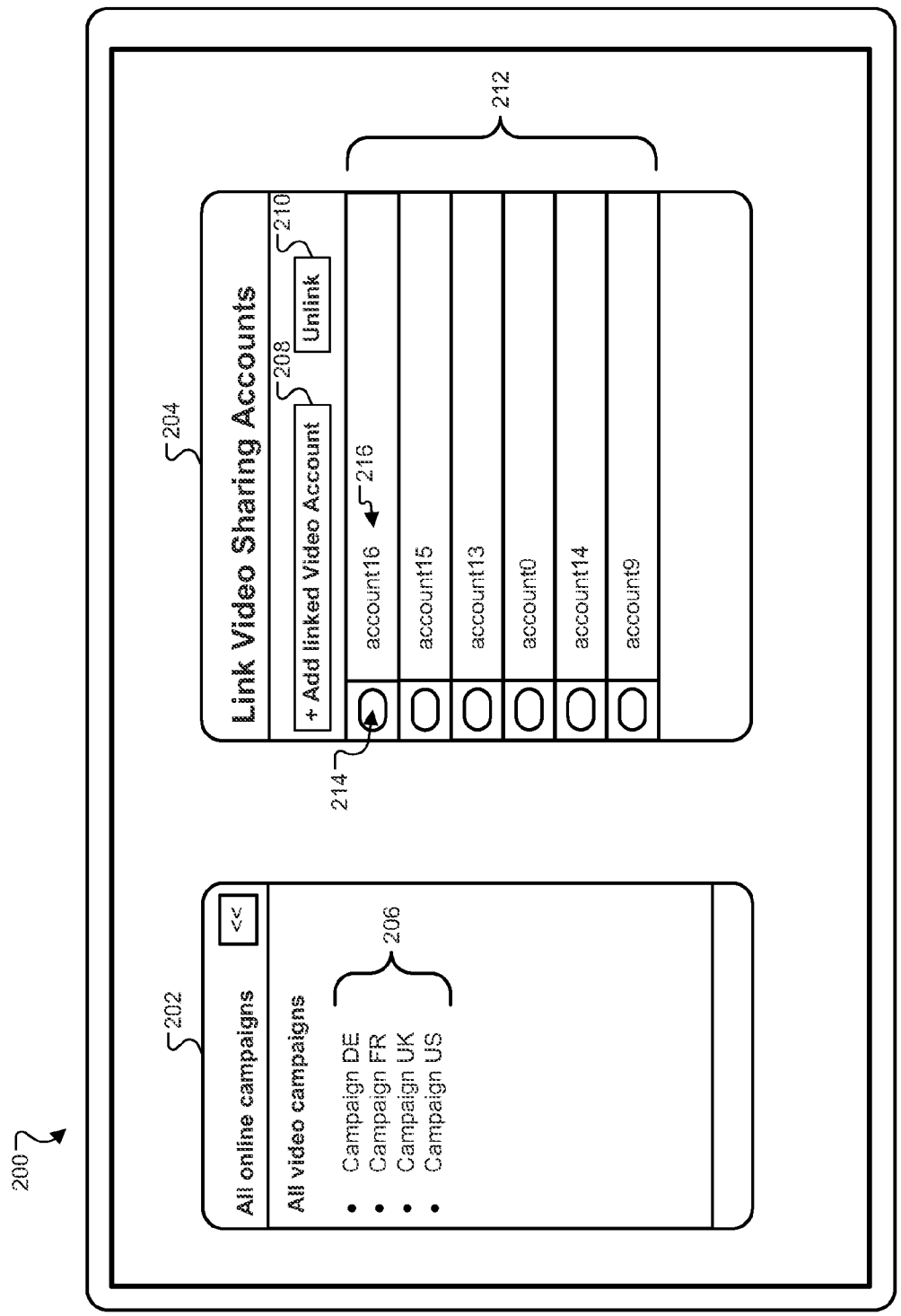
FIG. 2 illustrates a user interface for linking video sharing accounts to a content delivery account, e.g., as presented in a web browser.

FIG. 2 illustrates a user interface 200 for linking video sharing accounts to a content delivery account, e.g., as presented in a web browser. The user interface 200 includes a control, including left and right panes 202 and 204, for linking accounts. The control includes a linking tool for linking a content delivery account with one or more video sharing accounts in a video sharing environment (e.g., the example video sharing environment 100 of FIG. 1.)

The left pane 202 allows a user to select a content delivery account (which can be a specific campaign associated with a more general content delivery account.) The left pane 202 shows a list 206 of available content delivery accounts. The list 206 is presented, for example, after a user has supplied a name and login credentials for a content delivery account.

The right pane 204 allows a user to link and unlink video sharing accounts to the content delivery account selected in the left pane 202. The right pane 204 includes a list 212 of video sharing accounts currently linked to the content delivery account.

To link a video sharing account, the user can select the "Add linked Video Account" button 208. This will cause the user interface to request a name and login credentials for a video sharing account, e.g., by presenting a dialog box. When a valid account name and login credentials are supplied, the video sharing account can be linked to the content delivery account, and the video sharing account is added to the list 212 so that the account name (e.g., 216) is shown in the list 212.

To unlink a video sharing account, the user can select a checkbox (e.g., 214) next to the account name of the desired account in the list 212 and select the "Unlink" button 210. Multiple video sharing accounts can be selected at once so that multiple accounts can be unlinked with one selection of the button 210.

Figure 3:
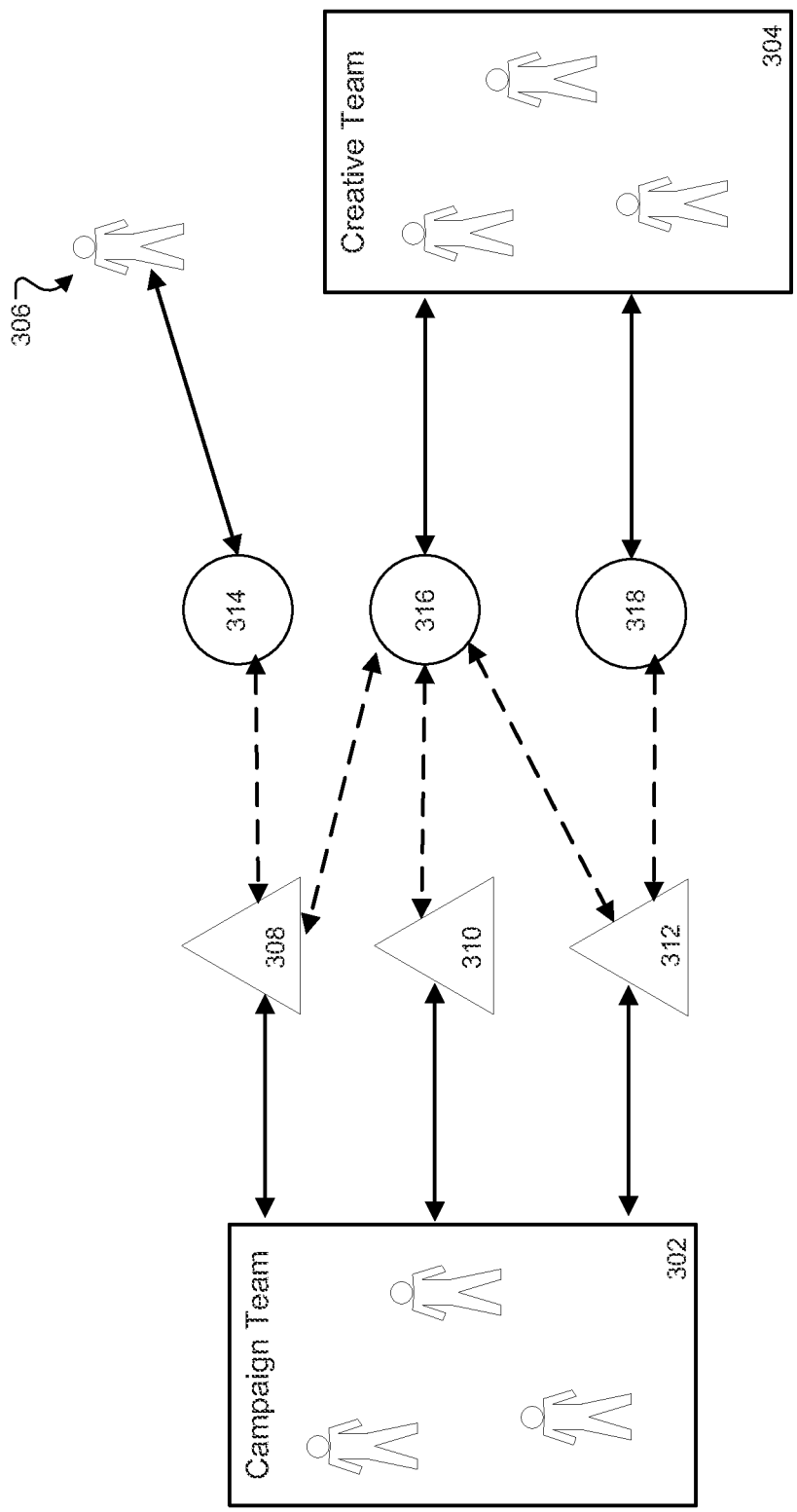
FIG. 3 is a schematic diagram illustrating example content delivery accounts linked to example video sharing accounts.

FIG. 3 is a schematic diagram illustrating example content delivery accounts 308, 310, and 312 linked to example video sharing accounts 314, 316, 318. Content delivery accounts are illustrated as triangles and video sharing accounts are illustrated as circles. Dotted lines between accounts indicate that the accounts are linked. FIG. 3 illustrates that a content delivery account can be linked to many video sharing accounts and that a video sharing account can be linked to many content delivery accounts.

A campaign team 302 can include one or more users. The campaign team 302 has three content delivery accounts 308, 310, 312 which can be, for example, different accounts for different countries or regions of a campaign, or different accounts for promoting different products. The campaign team 302 uses a creative team 304 of one or more users and an independent creative developer 306 to create videos. The creative team 304 has two video sharing accounts 316 and 318 that it uses when providing videos to a video sharing system, and the independent creative developer 306 has one video sharing account 314.

The first content delivery account 308 is linked to two video sharing accounts 314 and 316. Any user on the campaign team 302 who supplies content delivery credentials for the first content delivery account 308 can access certain information for the video sharing accounts 314 and 316 without having to supply each time the login credentials for those accounts. Similarly, any user on the campaign team 302 who supplies content delivery credentials for the second content delivery account 310 can access certain information for one of the video sharing accounts 316 of the creative team 304, and any user on the campaign team 302 who supplies content delivery credentials for the third content delivery account 312 can access certain information for the two video sharing accounts 316 and 318 of the creative team 304.

Thus, the first and third content delivery accounts 308 and 312 are linked to plural different video sharing accounts. Each of the video sharing accounts 316 and 318 of the creative team 304 is linked to plural different content delivery accounts.

Figure 4:
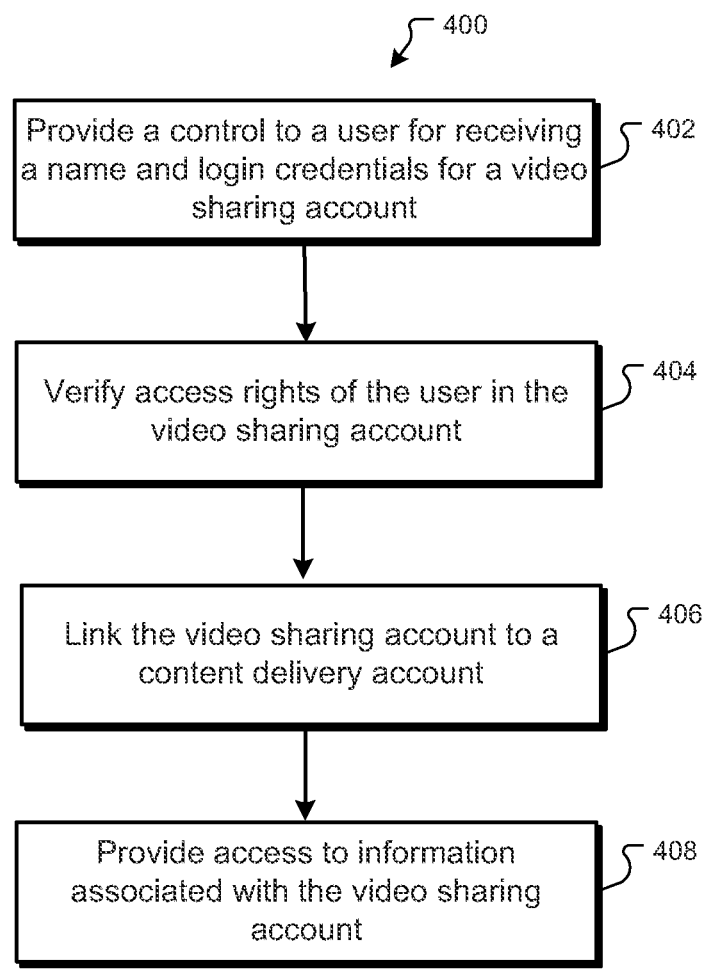
FIG. 4 is a flow diagram of an example process for providing a control for linking one or more video sharing accounts to a content delivery account.

FIG. 4 is a flow diagram of an example process 400 for providing a control for linking one or more video sharing accounts to a content delivery account. A system of one or more computers (e.g., one or both of the video sharing system 102 and the content delivery system 104 of FIG. 1) can perform the process 400. The control is provided in a user interface associated with a campaign management tool for a content delivery system. For example, the control can be the control illustrated in the user interface 200 of FIG. 2. The control includes a linking tool for linking a content delivery account associated with a user in the content delivery system with one or more video sharing accounts in a video sharing environment.

The control is provided to the user for receiving a name and login credentials associated with a first video sharing account in the video sharing environment (step 402). The control is provided to the user after the user has logged in to the content delivery account, e.g., by supplying content delivery credentials for the content delivery account.

Access rights of the user in the first video sharing account are verified using the name and login credentials (step 404). For example, the name and login credentials can be verified against account information (e.g., stored in the video sharing accounts repository 116 of FIG. 1.) Verifying access rights of the user can include determining if the name and login credentials match an entry on an approved access list that is associated with the first video sharing account.

The first video sharing account is linked with the content delivery account associated with the user in the content delivery system (step 406). For example, linking information is stored indicating that the first video sharing account is linked to the content delivery account.

Access is provided to information associated with the first video sharing account (step 408). The information can be, for example, the video related information as described above with reference to FIG. 1. Access to the information can be provided to another user that provides content delivery account credentials for the content delivery account without requiring the other user to provide the name and login credentials associated with the first video sharing account at each request.

Linking the first video sharing account with the content delivery account can include enabling the user to adjust video parameters for a video that is associated with the first video sharing account. Linking the first video sharing account with the content delivery account can include enabling the user to specify an overlay for inclusion in a video that is associated with the first video sharing account.

Linking the first video sharing account with the content delivery account can include linking the first video sharing account with plural different content delivery accounts in the content delivery system (e.g., as described above with respect to FIG. 3.) Linking the first video sharing account with the content delivery account can include linking plural different video sharing accounts in the video sharing environment with a content delivery account (e.g., as described above with respect to FIG. 3.)

Figure 5:
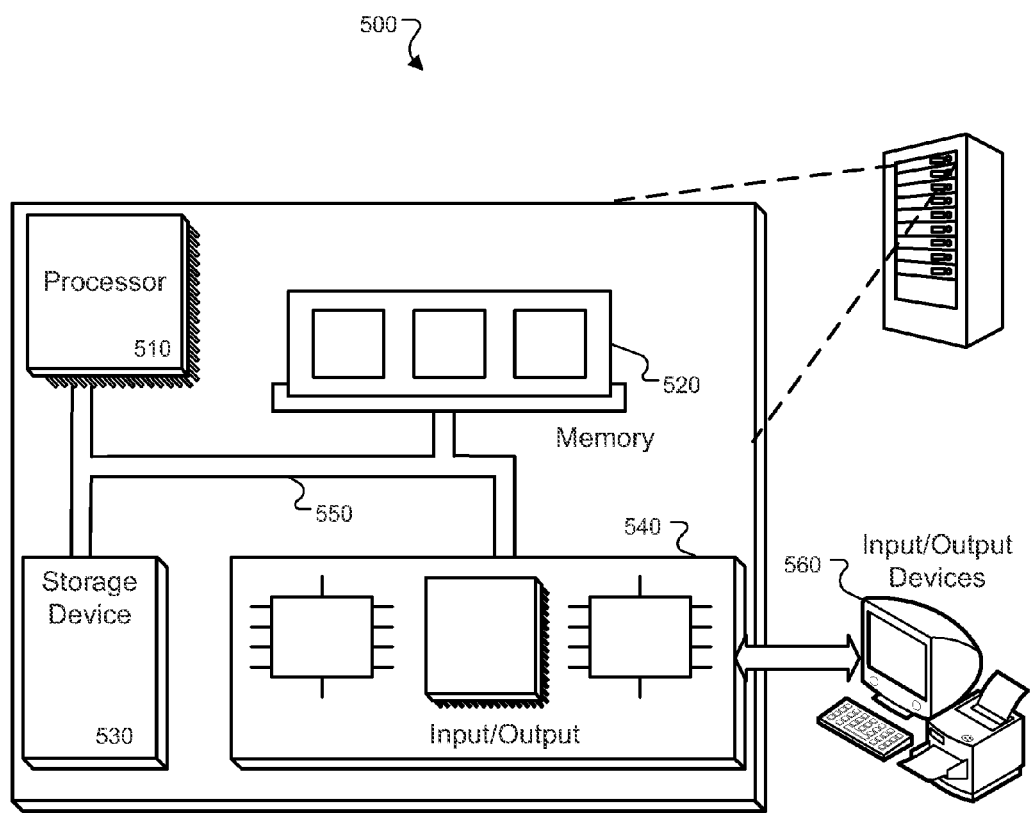
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
providing a control in a user interface of a campaign management tool of a content delivery system, the control facilitating a linking of a content delivery account associated with a user of the campaign management tool with a video sharing account in a video sharing system;
receiving, from the user via the user interface of the campaign management tool, a name and login credentials associated with the video sharing account;

verifying access rights of the user in the video sharing account using the name and login credentials to authenticate the user of the campaign management tool; and linking the video sharing account with the content delivery account associated with the user in the content delivery system, comprising:

providing access, to the authenticated user of the content delivery account via the campaign management tool, to information associated with a video shared by the video sharing account; and restricting access of the authenticated user to make an edit, via the campaign management tool, to the video, wherein the edit is performable within the video sharing system.

2. The method of claim 1, wherein verifying access rights of the user comprises determining if the name and login credentials match an entry on an approved access list that is associated with the video sharing account.

3. The method of claim 1, wherein providing access comprises providing access to another user that provides content delivery account credentials for the content delivery account without requiring the other user to provide the name and login credentials associated with the video sharing account.

4. The method of claim 1, wherein providing access comprises providing organic performance metrics for the video to the authenticated user, wherein the organic performance metrics for the video include a count of a number of views of the video for which no payment was received by the video sharing system, and wherein restricting access further comprises restricting the authenticated user from editing information associated with the video.

5. The method of claim 4, wherein the organic performance metrics for the video comprise a count of a number of views of the video by video sharing system users associated with a certain demographic or a certain geographic area.

6. The method of claim 1, wherein providing access comprises providing one or more of:

demographic information for viewers of a video, geographic information for viewers of a video, and video metadata.

7. The method of claim 1, wherein linking the video sharing account with the content delivery account comprises enabling the user to adjust video parameters for the video.

8. The method of claim 1, wherein linking the video sharing account with the content delivery account comprises enabling the user to specify an overlay for inclusion in the video.

9. The method of claim 1, wherein linking the video sharing account with the content delivery account comprises linking the video sharing account with different content delivery accounts in the content delivery system.

10. The method of claim 1, wherein linking the video sharing account with the content delivery account comprises linking different video sharing accounts in the video sharing system with the content delivery account.

11. A system comprising a processor in communication with a memory, the processor to perform operations comprising:

providing, by the processor, a control in a user interface of a campaign management tool for a content delivery system, the control facilitating a linking of a content delivery account associated with a user of the campaign management tool with a video sharing account in a video sharing system;

receiving, from the user via the user interface of the campaign management tool, a name and login credentials associated with the video sharing account;

verifying access rights of the user in the video sharing account using the name and login credentials to authenticate the user of the campaign management tool; and linking the video sharing account with the content delivery account associated with the user in the content delivery system, comprising:

providing access, to the authenticated user of the content delivery account via the campaign management tool, to of information associated with a video shared by the video sharing account; and restricting access of the authenticated user the video, wherein the edit is performable within the video sharing system.

12. The system of claim 11, wherein verifying access rights of the user comprises determining if the name and login credentials match an entry on an approved access list that is associated with the video sharing account.

13. The system of claim 11, wherein providing access comprises providing access to another user that provides content delivery account credentials for the content delivery account without requiring the other user to provide the name and login credentials associated with the video sharing account.

14. The system of claim 11, wherein providing access comprises providing organic performance metrics for the video the authenticated user, wherein the organic performance metrics for the video include a count of a number of views of the video for which no payment was received by the video sharing system, and wherein restricting access further comprises restricting the authenticated user from editing metadata associated with the video.

15. The system of claim 14, wherein the organic performance metrics for the video comprise a count of a number of views of the video by users associated with a certain demographic or a certain geographic area.

16. The system of claim 11, wherein providing access comprises providing one or more of demographic information for viewers of the video, geographic information for viewers of the video, or video metadata.

17. The system of claim 11, wherein linking the video sharing account with the content delivery account comprises enabling the user to adjust video parameters for the video.

18. The system of claim 11, wherein linking the video sharing account with the content delivery account comprises enabling the user to specify an overlay for inclusion in the video.

19. The system of claim 11, wherein linking the video sharing account with the content delivery account comprises linking the video sharing account with different content delivery accounts in the content delivery system.

20. The system of claim 11, wherein linking the video sharing account with the content delivery account comprises linking different video sharing accounts in the video sharing system with the content delivery account.

21. A non-transitory computer storage medium having instructions that, when executed by a processor, cause the processor to perform operations comprising:

providing a control in a user interface of a campaign management tool for a content delivery system, the control facilitating a linking of a content delivery account associated with a user of the campaign management tool with a video sharing account in a video sharing system;

receiving, from the user via the user interface of the campaign management tool a name and login credentials associated with the video sharing account;

verifying access rights of the user in the video sharing account using the name and login credentials to authenticate the user of the campaign management tool; and linking the video sharing account with the content delivery account associated with the user in the content delivery system, comprising:

providing access, to the authenticated user of the content delivery account via the campaign management tool, to information associated with a video shared by the video sharing account; and restricting access of the authenticated user to make an edit, via the campaign management tool, to the video, wherein the edit is performable within the video sharing system.

22. The non-transitory computer storage medium of claim 21, wherein verifying access rights of the user comprises determining if the name and login credentials match an entry on an approved access list that is associated with the video sharing account.

23. The non-transitory computer storage medium of claim 21, wherein providing access comprises providing access to another user that provides content delivery account credentials for the content delivery account without requiring the other user to provide the name and login credentials associated with the video sharing account.

24. The non-transitory computer storage medium of claim 21, wherein providing access comprises providing organic performance metrics for the video to the authenticated user, wherein the organic performance metrics for the video include a count of a number of views of the video for which no payment was received by the video sharing system, and wherein restricting access comprises restricting the authenticated user from editing metadata of the video.

25. The non-transitory computer storage medium of claim 24, wherein the organic performance metrics for the video include a count of a number of views of the video by users associated with a certain demographic or a certain geographic area.

26. The non-transitory computer storage medium of claim 21, wherein providing access comprises providing one or more of: demographic information for viewers of the video, geographic information for viewers of the video, and video metadata.

27. The non-transitory computer storage medium of claim 21, wherein linking the video sharing account with the content delivery account comprises enabling the user to adjust video parameters for the video.

28. The non-transitory computer storage medium of claim 21, wherein linking the video sharing account with the content delivery account comprises enabling the user to specify an overlay for inclusion in the video.

29. The non-transitory computer storage medium of claim 21, wherein linking the video sharing account with the content delivery account comprises linking the video sharing account with different content delivery accounts in the content delivery system.

30. The non-transitory computer storage medium of claim 21, wherein linking the video sharing account with the content delivery account comprises linking different video sharing accounts in the video sharing system with the content delivery account.

* * * * *